(12) United States Patent
Baldwin

(10) Patent No.: US 7,599,576 B2
(45) Date of Patent: Oct. 6, 2009

(54) IMAGE SUBTRACTION OF ILLUMINATION ARTIFACTS

(75) Inventor: Leo Baldwin, Portland, OR (US)

(73) Assignee: Electro Scientific Industries, Inc., Portland, OR (US)

(\*) Notice: Subject to any disclaimer, the term of this patent is extended or adjusted under 35 U.S.C. 154(b) by 703 days.

(21) Appl. No.: 10/921,032

(22) Filed: Aug. 18, 2004

(65) Prior Publication Data
US 2005/0163397 A1 Jul. 28, 2005

Related U.S. Application Data

(60) Provisional application No. 60/538,914, filed on Jan. 23, 2004.

(51) Int. Cl.
*G06K 9/40* (2006.01)

(52) U.S. Cl. .................... 382/275; 382/141

(58) Field of Classification Search ......... 382/141–154, 382/275
See application file for complete search history.

(56) References Cited

U.S. PATENT DOCUMENTS

| | | | |
|---|---|---|---|
| 5,231,536 A | 7/1993 | Wilt et al. | |
| 5,420,638 A * | 5/1995 | Riglet et al. | 375/240.15 |
| 5,428,448 A * | 6/1995 | Albert-Garcia | 356/612 |
| 5,469,294 A | 11/1995 | Wilt et al. | |
| 5,737,122 A | 4/1998 | Wilt et al. | |
| 5,825,936 A * | 10/1998 | Clarke et al. | 382/261 |
| 6,259,827 B1 * | 7/2001 | Nichani | 382/291 |
| 6,445,451 B1 * | 9/2002 | Douglas-Hamilton et al. | 356/425 |
| 6,445,812 B1 | 9/2002 | Lai et al. | |
| 6,674,079 B2 * | 1/2004 | Sauer et al. | 250/330 |
| 6,681,037 B1 | 1/2004 | Koljonn | 382/141 |
| 7,095,904 B2 * | 8/2006 | Wang | 382/280 |

(Continued)

FOREIGN PATENT DOCUMENTS

JP 2001-268326 A 9/2001

(Continued)

OTHER PUBLICATIONS

Steve Paddock: "Confocal Reflection Microscopy: The "Other" Confocal Mode" Biotechniques, vol. 32, No. 2, Feb. 2002, pp. 274-278, XP002332442.

(Continued)

*Primary Examiner*—Wenpeng Chen
*Assistant Examiner*—Eueng-Nan Yeh
(74) *Attorney, Agent, or Firm*—Young Basile

(57) ABSTRACT

A method of removing an artifact resulting from an in-line illumination device of an imaging system from an object image. It includes obtaining a first image of the artifact using a first artifact illumination level and imaging the object using the imaging system wherein the illumination device is using an object illumination level. An artifact image is independent of the object and has pixel values related to the illumination level. Thus, the artifact can be removed by subtracting respective pixel values of an artifact image from respective values of the object image on a pixel address-by-pixel address basis. Various illumination levels can be used to create more than one artifact image. The artifact image for the subtraction can be one of the images taken or can be a scaled image where an artifact image is scaled to the object illumination level.

21 Claims, 3 Drawing Sheets

U.S. PATENT DOCUMENTS

| | | |
|---|---|---|
| 2002/0009218 A1 | 1/2002 | Chapman et al. |
| 2002/0037105 A1 | 3/2002 | Michael |
| 2002/0113970 A1 | 8/2002 | Baldwin et al. |
| 2003/0009242 A1 | 1/2003 | Bocchi |
| 2003/0197880 A1* | 10/2003 | Nakao ........................ 358/1.9 |

FOREIGN PATENT DOCUMENTS

| | | |
|---|---|---|
| JP | 2004-016486 A | 1/2004 |
| JP | 2004-016983 A | 1/2004 |
| WO | 03/000122 A1 | 1/2003 |
| WO | WO 03/000122 | 1/2003 |

OTHER PUBLICATIONS

PCT/US2004/027167: International Search Report and Written Opinion of the International Searching Authority.

Steve Paddock, Confocal Reflection Microscopy: The "Other Confocal Mode," BioTechniques, vol. 32, No. 2, pp. 274-277 (2002).

* cited by examiner

IMAGE SUBTRACTION OF ILLUMINATION ARTIFACTS

CROSS-REFERENCE TO RELATED APPLICATION

This application claims the benefit of the priority date of U.S. Provisional Patent Application Ser. No. 60/538,914, which was filed on Jan. 23, 2004.

BACKGROUND OF THE INVENTION

In image processing, the goal is to examine an image of an object in order to extract some useful information about that object. This is most often done by analyzing variations in the brightness value of spatially separated elements of the image and comparing them to one another or comparing them to a priori determined values.

It is not uncommon that there are brightness value variations within an image of an object that do not convey information about the object, but rather convey spurious information about the illumination system used to light the object or the imaging system used to optically form the image on the image sensor or about other aspects of the object's environment. When it is not possible to control the environment or the lighting or the optical system in such a way as to eliminate these artifacts, the system that analyzes the image to extract useful information must cope with these artifacts; that is the system must extract the salient features of the object from the image while ignoring spurious information from the artifacts.

In imaging systems with an in-line coaxial illumination device are well known in the art and were first widely used in biological microscopes. In general, in-line coaxial illumination devices introduce a light source either between the image plane and the lens, or within the lens itself between the optical elements. The elements of the lens between the light source and the object may be used to focus or collimate the light and cause the light to impinge the object along a complimentary path to the image-forming rays. This method can result in increased contrast of the image of the object and also in more compact assemblies as additional space between the lens and the object is not required to introduce the illumination.

The problem with imaging systems such as these is that a portion of the illumination may be reflected by the optical elements between the illumination source and the object in a direction back toward the image plane where the illumination may register as an image artifact. Traditionally, the response to this has been to use careful optical design practices, including baffling and antireflection coatings, to minimize the artifacts from this type of lighting.

SUMMARY OF THE INVENTION

Artifacts due to in-line coaxial illumination are completely independent of the object being imaged, and the artifact is substantially additive to the image of the object. The artifact can be completely characterized a priori, such that the artifact may be automatically subtracted from an image of an object. This invention provides a method for removing the artifact from an image of an object by imaging an object and digitally processing the image to subtract a previously-characterized artifact. Specifically, the method includes the steps of obtaining a first image of an artifact resulting from an in-line illumination device of an imaging system using a first artifact illumination level, imaging an object to be analyzed using the imaging system wherein the in-line illumination device is using an object illumination level, and subtracting respective pixel values of an artifact image from respective values of the object image on a pixel address-by-pixel address basis. The artifact image could be the first image of the artifact or could be a scaled image of the first image. Of course, multiple images of the artifact could be taken at differing illumination levels prior to analyzing the object. Then, the image of the artifact having an illumination closest to the illumination level of the object could be used for the subtraction, or that image could be scaled to the illumination level of the object prior to the subtraction.

Preferably, this digital removal of the illumination artifacts would occur automatically, in-line, before the image was reported or presented for viewing, or before any subsequent image analysis was performed on the image to determine specific characteristics of the object being imaged.

By digitally subtracting out the in-line on-axis illumination artifacts, a system so configured may be more sensitive to features of the object, as they will now be rendered in the image with less interference from the illumination artifacts. Additionally, a system so equipped may be operated at overall higher illumination levels without undue interference from illumination artifacts, increasing the domain of object types that may be inspected and the type of information about the object that may be extracted from the image.

Other applications of the present invention will become apparent to those skilled in the art when the following description of the best mode contemplated for practicing the invention is read in conjunction with the accompanying drawings.

DETAILED DESCRIPTION OF THE DRAWINGS

The description herein makes reference to the accompanying drawings wherein like reference numerals refer to like parts throughout the several views, and wherein.

DETAILED DESCRIPTION OF THE PREFERRED EMBODIMENT

The invention involves digitally recording an illumination artifact associated with an imaging system. This artifact may then be later subtracted from subsequent images to remove the artifact from such images.

Figure 5:
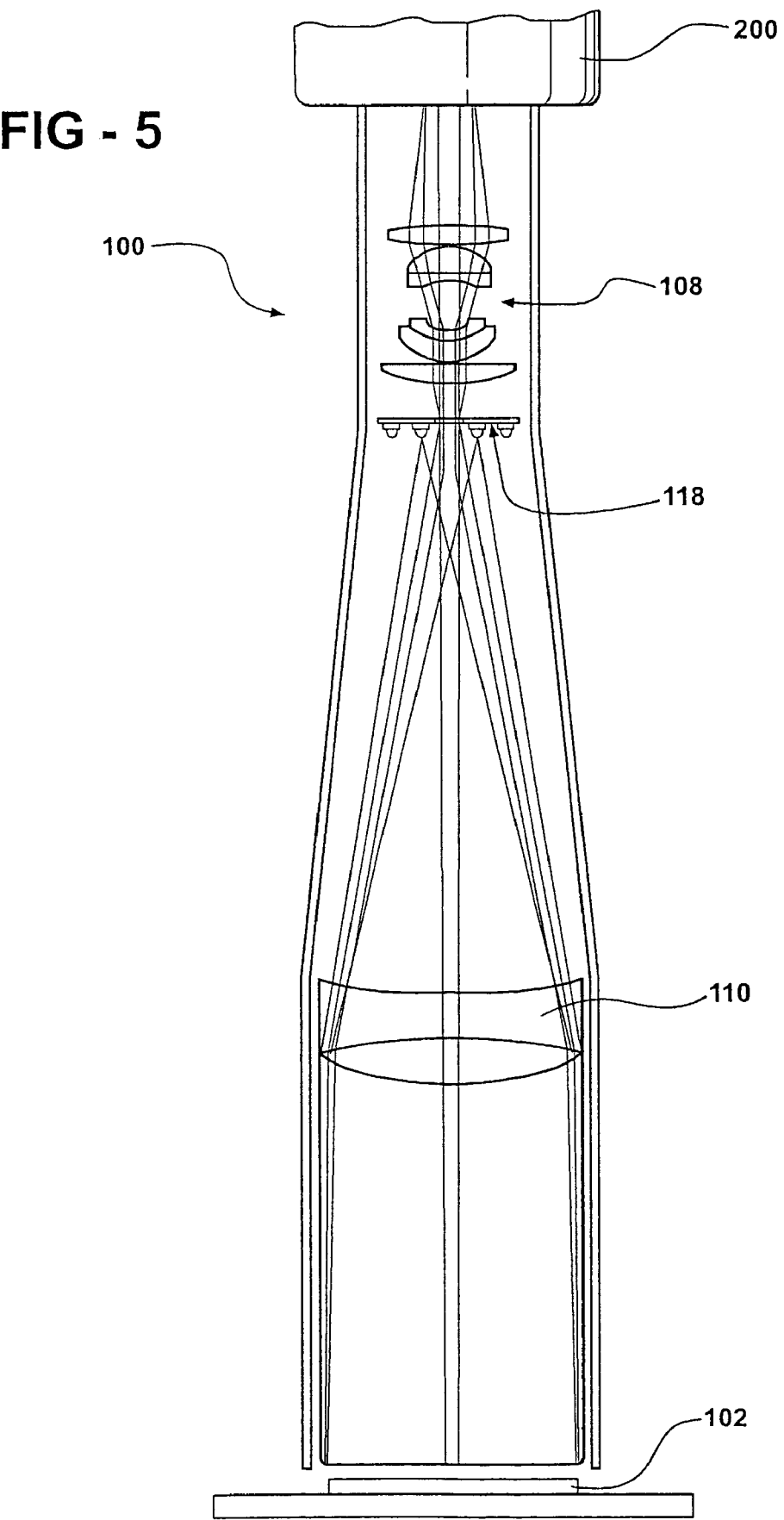
FIG. 5 is one embodiment of an in-line illumination system that can be used with the present invention.

This invention is preferably utilized in combination with in-line illumination systems that can result in artifacts from internal reflections. One such in-line system is described in U.S. patent application Ser. No. 10/373,934, filed Feb. 26, 2003, now U.S. Pat. No. 6,870,049, which is incorporated herein in its entirety by reference. As shown in FIG. 5, such a system can include an imager 100 generally defined by an illumination source 118, an imaging lens 108, an electronic image detector such as a video camera 200, and a digital computing device (not shown) capable of accepting images electronically or optically from the electronic image detector and a set of instructions (a computer program) for digitally processing said image, typically for extracting information about the object or objects being imaged 102. The video camera 200 typically can include a CMOS or CCD sensor. In the preferred embodiment of the invention, at least one mode or aspect of the illumination system 118 is in-line with the imaging lens 108 and is projected through at least one lens element 110 before illuminating the object. The illumination is preferably controlled by the digital computing device.

The artifacts resulting from the system described in U.S. patent application Ser. No. 10/373,934 have some identifiable properties although other in-line illumination devices exhibit similar properties. First, the artifacts are substantially additive to the image of the object in intensity space (a map of the intensity of the returned illumination, pixel-by-pixel, commonly just referred to as the image). Second, they are substantially independent of the object. This means that the artifacts can be fully documented a priori and the information stored for use during operation, where the image subtraction may be done inline. Finally, the artifacts do not have to be characterized at every illumination level. Instead, they can be characterized at a few well-chosen illumination levels, and the characteristics required for subtraction can be interpolated or extrapolated from these few samples due to the direct relationship between the in-line illumination intensity and the characteristics of the artifact. This technique, of course, presumes that the illumination levels are known to the vision system.

It should be noted that the above described properties will not hold if the image goes into saturation. That is, if the light intensity exceeds the sensitivity of the camera. If the image does saturate, then information is lost. (Saturated values are indeterminate values, e.g., those where the dynamic range of the image sensor has been exceeded.) Saturation can be mitigated if the illumination levels are under control of the vision system. That is, the system can be programmed so that, as a first precaution, the intensity of the artifact is never saturated (i.e., a limit can be set). In a more sophisticated system, an automatic illumination-level control scheme can be programmed so that no part of the image is ever saturated.

At setup time, a black object (or no object) is placed before the imaging system. This setup may be performed at the time the imaging system is manufactured, or it may be performed when the system is deployed. With the imaging system configured so that there is no return image from an object, the image of the back-reflection of the in-line illumination source from the lens element or elements onto the electronic image detector is the only item imaged. This artifact is stored within the digital computing device. Images of the back reflection or artifact may be made for every illumination level of the in-line illumination source, or for only a few illumination levels.

Figure 3:
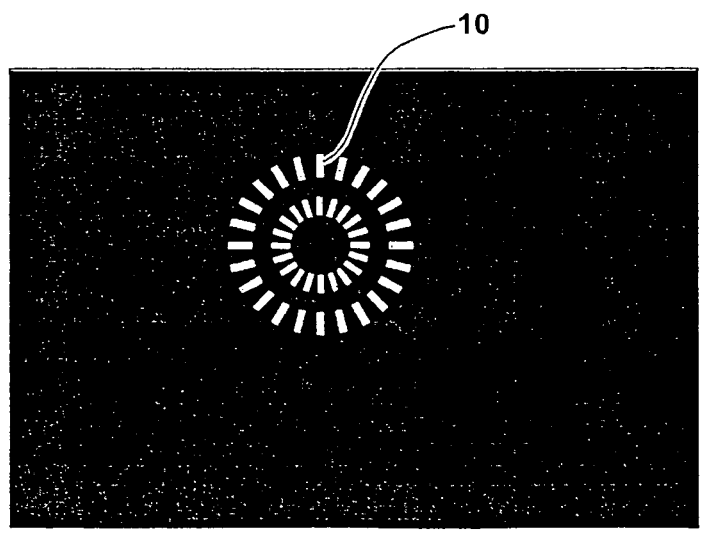
FIG. 3 is an image of black velvet including the illumination artifact of image 1.

With reference to FIG. 3 there is shown an image in which an artifact 10 is the sole content of the image. The image of FIG. 3 is shown as taken against a black backdrop. In a preferred embodiment, an illumination level that is one level below that required to cause image saturation is determined. That illumination level is stored by the digital computing device and used to set the maximum illumination level that can be set by the system for in-line illuminations of an object. Preferably, at least one image of an artifact at this maximum illumination level is stored on the digital computing device, and at least one additional image of an artifact at a lower illumination level is stored. Preferably, this lower illumination level is substantially lower that the maximum illumination level, i.e., a level such as one quarter or one half of the maximum illumination level, but above the noise level of the sensor/imager being used. The noise level of a sensor/imager varies with the configuration used and is a quantity that can be determined by those skilled in the art. Using a minimum illumination level above the noise level assures that there is sufficient intensity to register a usable image.

Figure 1:
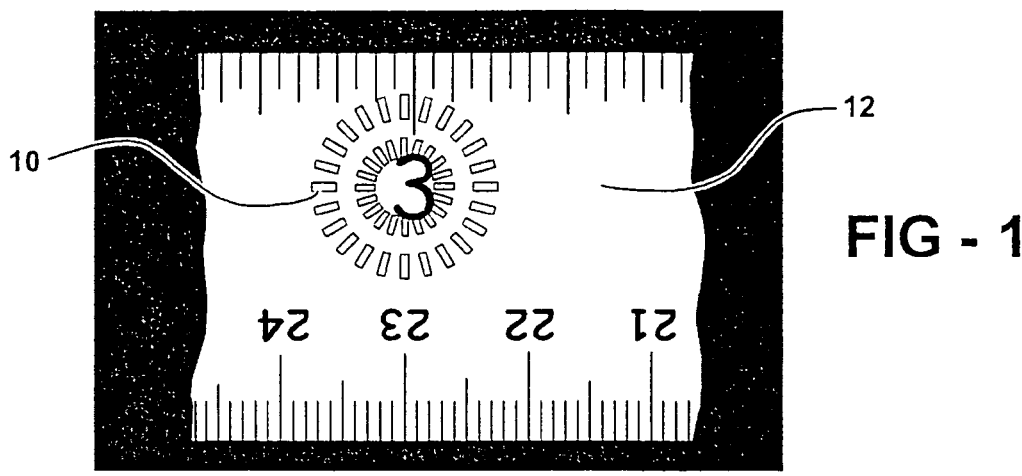
FIG. 1 is an image of a machinist's rule with an illumination artifact.
Figure 2:
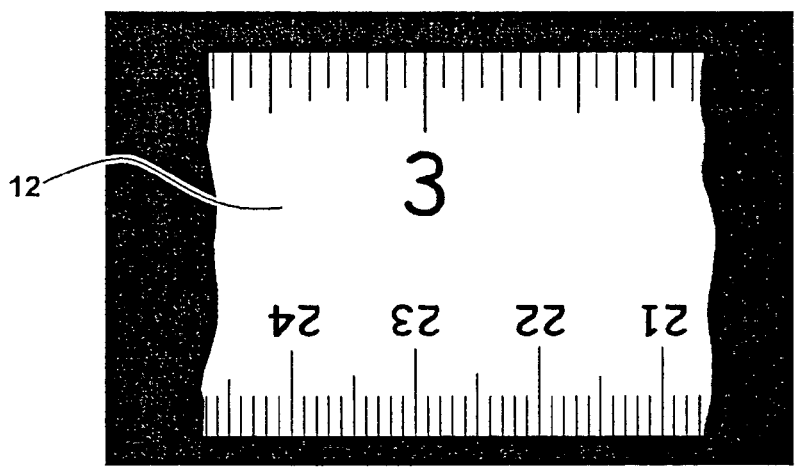
FIG. 2 is an image of the machinist's rule of FIG. 1 where the artifact illustrated in FIG. 3 has been subtracted.

With reference to FIG. 1, during operation of the system, for each object 12 imaged, an image of the artifact 10 is also present. The artifact 10 may then be subtracted to yield only an image of the object 12 which is shown in FIG. 2. As shown in FIG. 1, initially, the image of the object 12 will include the artifact 10 from the in-line illumination, and after the subtraction, as shown in FIG. 2, the artifact 10 will be substantially removed from the image of said object 12. This results in a generally improved image with less spurious information that could interfere with the stated purpose of extracting information about the object from the image of said object 12.

If an image of the in-line illumination artifact corresponding to the same illumination intensity used to obtain the initial object image is not available, then scaling can be used to obtain substantially the same result. Recall the direct relationship between the in-line illumination intensity and the characteristics of the artifact. Thus, the intensities (gray-scale levels) of an available artifact image can be scaled using a ratio of the intensities used to make the artifact image and the object image. This suitably-scaled artifact image is used for the subtraction.

Figure 4:
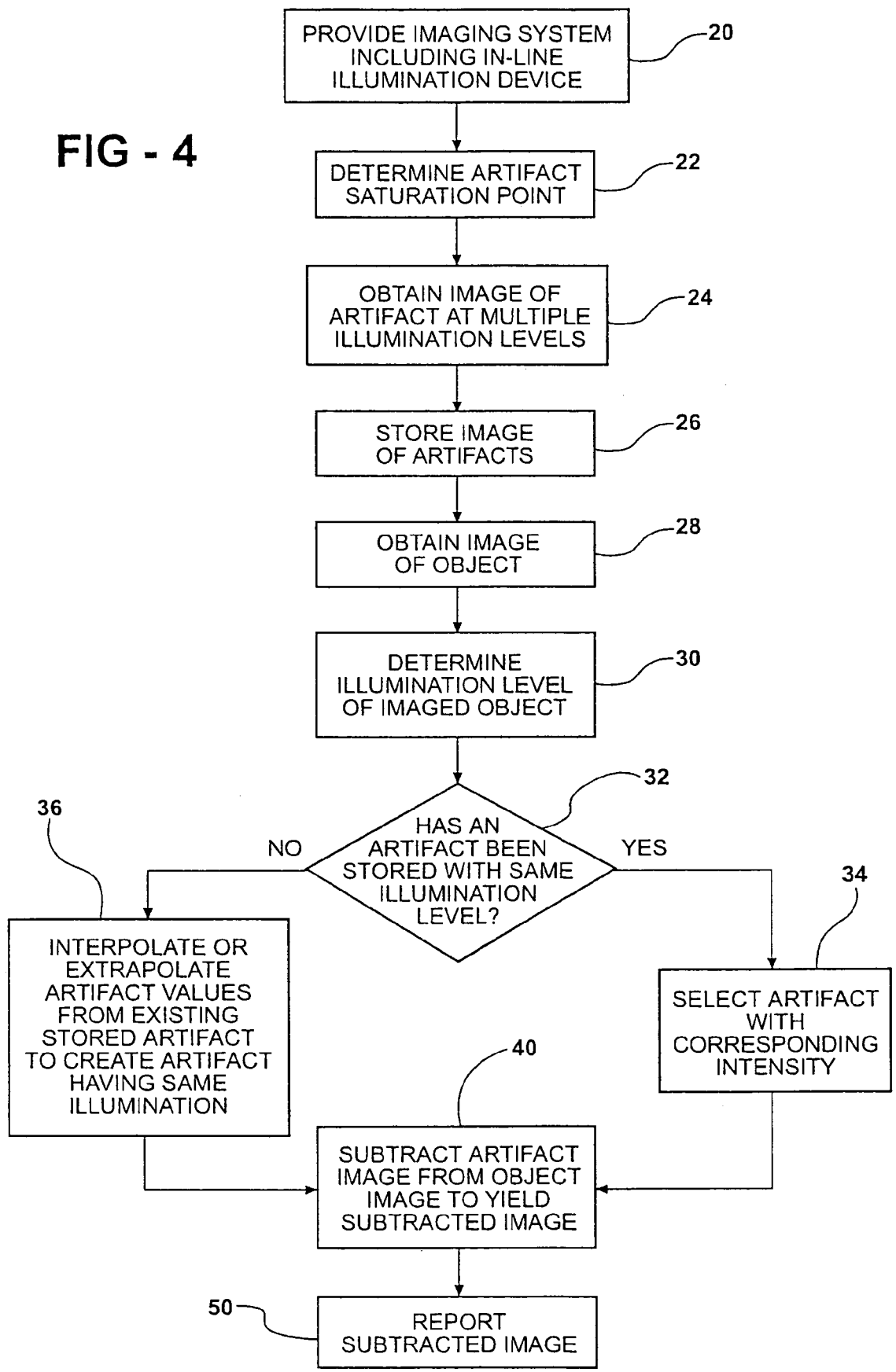
FIG. 4 is a process flow chart illustrating a preferred embodiment of the present invention.

With reference to FIG. 4 there is shown a flow diagram illustrating an embodiment of the present invention. At 20, an in-line illumination device, preferably of the type described above, is provided. At 24 the artifact saturation point is determined and stored. At 22, images of an artifact associated with the imaging system are captured. In the preferred embodiment, multiple artifacts are captured at different illumination levels. As described above, the artifacts can be captured by imaging black velvet or any other blank surface that does not charge the video camera. In one embodiment two artifacts are captured and stored, one artifact associated with an illumination level near the saturation and one of roughly half that illumination level.

At 26 the images of the artifacts are stored with each artifact image having an associated intensity level. It is understood by those of ordinary skill in the art that each artifact image is stored by pixel value and pixel location. The pixel value and the pixel location of the artifact as described above, for any particular lighting condition, will reproduce itself in subsequent images regardless of the object being imaged so long as the imaging device has not reached saturation.

At 28 an object of an image is obtained using the imaging system including the in-line illumination device. At 30 the intensity or illumination level of the image captured at 30 is determined. The object will have been imaged at a known intensity level. At 32 it is determined whether one of the stored artifacts has the same illumination level as that of the image captured at 28. If the answer to the query at 32 is yes, that corresponding artifact is selected at 34 and the process moves to block 40.

If the answer to the query at 32 is no, an artifact is calculated at 36 for the illumination level of the image captured at 30 by interpolating or extrapolating an artifact with the known intensity from the stored artifact values. For example, if the known illumination intensity of a stored artifact is half of the level of the illumination intensity of the image captured at 30, the values of the stored artifact are doubled at 36 to create a new artifact image.

As described above the image of the object captured at 28 will include the artifact superimposed thereon. The artifact 10 of FIG. 1 is in the same location and is the same artifact as the artifact 10 in FIG. 3. At 40, the artifact supplied at block 34 or 36 is subtracted from the image captured at 28. This yields a subtracted image at 50 such as that illustrated in FIG. 2 in which the artifact is no longer present.

It is understood that in this description blocks 28, 30 and 32 are not necessary to practice the present invention and that those blocks merely improve the accuracy of the subtracted image.

Moreover, it should also be understood that the order represented is merely one order in which the steps can be performed. That order is useful for one time recording of the artifact image to be used with a variety of objects to be imaged and analyzed. Another useful embodiment results whereby the operator of the image system sets the illumination levels according to the particular object being imaged. Specifically, an object is imaged first. Then, a null or dark object as described previously is substituted to capture the artifact image at the illumination level used for the object. The subtraction of the artifact from the object image can then be performed. Any similar objects would then have the same artifact subtracted without adjustment due to changes in the illumination level. Although this embodiment would not be as convenient as that described previously when dissimilar objects are being analyzed it would be useful in a repetitive task, such as analyzing a large number of similar objects in an industrial conveyor-line setting.

What is claimed is:

1. A method of removing an artifact resulting from an in-line illumination device of an imaging system from an image of an object to be analyzed, the imaging system including a camera, the method comprising:
   using a processor for obtaining a plurality of artifact images using respective artifact illumination levels from the in-line illumination device, the in-line illumination device introducing a light source between the camera and a plane of an object to be analyzed, and each artifact image being a specular image of the light source as specularly reflected back from one or more lens elements of the camera onto an image detector of the camera;
   imaging the object to be analyzed using the camera wherein the in-line illumination device is using an object illumination level; and
   using respective pixel values of at least one of the plurality of artifact images to adjust respective values of the object image on a pixel address-by-pixel address basis to obtain a corrected image of the object using the processor.

2. The method according to claim 1 wherein obtaining the plurality of artifact images further comprises:
   setting a black object before the imaging system; and
   obtaining an artifact image at each of the respective artifact illumination levels.

3. The method according to claim 1 wherein using the respective pixel values of the artifact image comprises subtracting respective pixel values of a first artifact image from respective values of the object image to obtain the corrected image of the object.

4. The method according to claim 1 wherein the object illumination level is equal to a first artifact illumination level; and wherein using the respective pixel values of the artifact image further comprises subtracting respective pixel values of a one of the plurality of artifact images associated with the first artifact illumination level from respective values of the object image on a pixel address-by-pixel address basis.

5. The method according to claim 1 wherein obtaining a plurality of artifact images comprises imaging the artifact at a first artifact illumination level to obtain a first artifact image and creating a second artifact image by scaling the first artifact image; and wherein using respective pixel values of the artifact image comprises subtracting respective pixel values of the second image from respective pixel values of the object image on a pixel address-by-pixel address basis.

6. The method according to claim 5 wherein creating the second artifact image further comprises multiplying each pixel value of the first artifact image by a ratio of the object illumination level to the first artifact illumination level.

7. The method according to claim 1, further comprising:
   determining a maximum illumination level that is one level below that required to cause image saturation; and
   using the maximum illumination level as a first artifact illumination level to create a first artifact image.

8. The method according to claim 7, further comprising:
   creating a second artifact image resulting from the in-line illumination device of the imaging system using a second artifact illumination level lower than the maximum illumination level.

9. The method according to claim 8, further comprising:
   comparing the object illumination level to each of the first artifact illumination level and the second artifact illumination level; and wherein using respective pixel values of the artifact image comprises:
   subtracting respective pixel values of the first artifact image from respective values of the object image on a pixel address-by-pixel address basis to obtain the corrected image of the object when the first artifact illumination level is closer to the object illumination level than the second artifact illumination level; and
   subtracting respective pixel values of the second artifact image from respective values of the object image on a pixel address-by-pixel address basis to obtain the corrected image of the object when the second artifact illumination level is closer to the object illumination level than the first artifact illumination level.

10. The method according to claim 1 wherein obtaining the plurality of artifact images includes:
    obtaining a first artifact image using a first artifact illumination level; and
    obtaining a second artifact image using a second artifact illumination level; and further comprising:
    comparing the object illumination level to each of the first artifact illumination level and the second artifact illumination level;
    using the first artifact image to adjust respective values of the object image when the first artifact illumination level is closer to the object illumination level than the second artifact illumination level; and
    using the second artifact image to adjust respective values of the object image when the second artifact illumination level is closer to the object illumination level than the first artifact illumination level.

11. The method according to claim 1 wherein obtaining the plurality of artifact images includes:
    obtaining a first artifact image using a first artifact illumination level; and
    obtaining a second artifact image using a second artifact illumination level; and further comprising:
    comparing the object illumination level to each of the first artifact illumination level and the second artifact illumination level; and
    scaling one of the first artifact image and the second artifact image when the object illumination level is different from each of the first artifact illumination level and the second artifact illumination level.

12. The method according to claim 11 wherein using respective pixel values of at least one of the artifact images further comprises subtracting respective pixel values of the image created by the scaling from respective values of the object image on a pixel address-by-pixel address basis to obtain the corrected image.

13. The method according to claim 11 wherein scaling one of the first artifact image and the second artifact image comprises:
   multiplying each pixel value of the first artifact image when the first artifact illumination level is closer to the object illumination level than the second artifact illumination level; and
   multiplying each pixel value of the second artifact image when the second artifact illumination level is closer to the object illumination level than the first artifact illumination level.

14. The method according to claim 13 wherein using respective pixel values of at least one of the artifact images further comprises subtracting respective pixel values of the image created by the scaling from respective values of the object image on a pixel address-by-pixel address basis to obtain the corrected image.

15. The method according to claim 1 wherein obtaining each of the plurality of artifact images further comprises:
   retrieving the plurality of artifact images, the plurality of artifact images being stored with the respective artifact illumination levels.

16. The method according to claim 1 wherein obtaining the plurality of artifact images further comprises:
   imaging at a first artifact illumination level to obtain a first artifact image; and
   using the first artifact image to obtain a second artifact image at a second artifact illumination level.

17. A method of removing an artifact resulting from an in-line illumination device of an imaging system from an image of an object to be analyzed, the imaging system including a camera, the method comprising:
   using a processor for obtaining a plurality of artifact images using respective artifact illumination levels from the in-line illumination device, the in-line illumination device introducing a light source between the camera and a plane of an object to be analyzed, and each artifact image being a specular image of the light source as specularly reflected back from one or more lens elements of the camera onto an image detector of the camera;
   imaging the object to be analyzed using the camera wherein the in-line illumination device is using an object illumination level; and
   subtracting respective pixel values of one of the plurality of artifact images from respective values of the object image on a pixel address-by-pixel address basis to obtain a corrected image of the object using the processor.

18. The method according to claim 17, further comprising:
   selecting one image of the plurality of artifact images wherein the respective artifact illumination level associated with the one image is equal to the object illumination level; and wherein subtracting respective pixel values of one of the plurality of artifact images from respective values of the object image on a pixel address-by-pixel address basis to obtain a corrected image of the object comprises:
   subtracting respective pixel values of the selected image from respective values of the object image on the pixel address-by-pixel address basis.

19. The method according to claim 17, further comprising:
   comparing the respective artifact illumination level of each of the plurality of artifact images to the object illumination level; and
   creating a scaled image using one of the plurality of artifact images when no respective artifact illumination level is equal to the object illumination level; and wherein subtracting respective pixel values of one of the plurality of artifact images from respective values of the object image on a pixel address-by-pixel address basis to obtain a corrected image of the object includes:
   subtracting respective pixel values of the scaled image from respective values of the object image on the pixel address-by-pixel address basis.

20. The method according to claim 19 wherein creating a scaled image further comprises:
   multiplying each pixel value of the one of the plurality of artifact images by a ratio of the object illumination level to an artifact illumination level of the one of the plurality of artifact images.

21. The method according to claim 17 wherein obtaining the plurality of artifact images further comprises:
   imaging at a first artifact illumination level to obtain a first artifact image; and
   using the first artifact image to obtain a second artifact image at a second artifact illumination level.

* * * * *